United States Patent [19]

Meachum

[11] Patent Number: 5,419,661
[45] Date of Patent: May 30, 1995

[54] ROTATABLE TOOHOLDER HAVING A STATIONARY, THROUGH-CENTER COOLANT FEED SYSTEM

[75] Inventor: Donald E. Meachum, Louisburg, N.C.

[73] Assignee: Kennametal Inc., Latrobe, Pa.

[21] Appl. No.: 279,461

[22] Filed: Jul. 25, 1994

[51] Int. Cl.$^6$ ............................................. B23B 51/06
[52] U.S. Cl. ...................................... 408/57; 409/136
[58] Field of Search ...................... 408/57, 59, 56, 61, 408/124, 60; 409/136

[56] References Cited

U.S. PATENT DOCUMENTS

| | | | |
|---|---|---|---|
| 3,487,748 | 1/1970 | Grage | 408/59 |
| 3,985,367 | 10/1976 | Martino et al. | 408/59 |
| 4,293,251 | 10/1981 | Anderson | 408/59 |
| 4,396,317 | 8/1983 | Staron et al. | 408/59 |
| 4,598,617 | 7/1986 | Kubo et al. | 82/36 R |
| 4,636,118 | 1/1987 | Hunt | 409/136 |
| 4,668,135 | 5/1987 | Hunt | 409/136 |
| 4,679,970 | 7/1987 | Lohneis et al. | 408/128 |
| 5,077,876 | 1/1992 | McConkey | 29/27 R |
| 5,290,135 | 3/1994 | Ball et al. | 407/11 |

*Primary Examiner*—Daniel W. Howell
*Attorney, Agent, or Firm*—James G. Porcelli

[57] ABSTRACT

A rotatable toolholder is provided having a stationary coolant feed system for directing a through-center, non-rotating coolant stream to a coolant conducting bore in a rotating cutting tool. The rotatable toolholder comprises a stationary housing, a driven shaft having an output end rotatably mounted in the housing, and a tool coupling rotatably mounted on an opposite side of the housing for holding and rotating the end of a cutting tool. The coolant system of the toolholder includes a nozzle assembly stationarily mounted within the housing and having a nozzle for directing a non-rotating stream of coolant into the coolant conducting bore of the tool, and a stationary conduit for conducting a coolant flow from a source of pressurized coolant to the nozzle assembly while isolating the coolant flow from the rotating components within the housing. A transmission assembly is provided within the housing for transmitting rotary power from the driven shaft to the tool coupling. The use of a stationary nozzle assembly isolates the flow of coolant from centrifugal forces that the rotating components within the housing would otherwise apply to it, while the isolating function of the coolant supply conduit obviates the need for dynamic fluid seals between the housing and the driven shaft and tool coupling that leak and create frictional drag, and also renders unnecessary micro particle filtration of recirculated coolant.

20 Claims, 3 Drawing Sheets

ROTATABLE TOOHOLDER HAVING A STATIONARY, THROUGH-CENTER COOLANT FEED SYSTEM

BACKGROUND OF THE INVENTION

This invention generally relates to toolholders for use with cutting tools, and is specifically concerned with to a rotatable toolholder having a stationary, through-center coolant feed system for providing a non-rotating stream of coolant to a rotating metal cutting tool.

Cutting tools used for such operations as drilling, milling, or reaming metal workpieces frequently require the application of a coolant at the interface between the workpiece and the cutting surfaces of the tool. The use of a coolant advantageously reduces the heat generated by the machining operation by reducing the friction between the tool and the workpiece, and by transferring the generated heat from the cutting interface to the coolant. Such heat reduction is important as the generation of excessive heat prematurely dulls the cutting tool, thus lowering the quality of the cuts produced by the tool, and shortening its useful life span. Excessive heat can also damage the workpiece.

Systems for providing coolant at the interface between such cutting tools and their respective workpieces are known in the prior art. While some of these systems operate by directing a stream of coolant from one side of the cutting action, there is an increasing demand for systems that direct the coolant through the center of the cutting tool directly to the point of contact between the workpiece and the cutting surfaces of the tool. Such through-center coolant systems allow the cutting tool to be rotated at a faster cutting speed while simultaneously achieving a finer and cleaner cut.

Prior art toolholders having such through-center coolant systems generally comprise a toolholder shank having a proximal end that is detachably connectable to the drive shaft of a turning tool, and a distal end that is connected to a tool coupling, which may be a collet-type coupling arrangement capable of firmly grasping the shank end of a cutting tool. A stationary housing envelops the toolholder in the area between the distal end of the toolholder shank and the proximal end of the toolholder coupling. Bearings are provided at the interfaces between the housing and the toolholder so that the toolholder may rotate with respect to the stationary housing. Dynamic fluid seals are also provided at the interfaces between the housing walls, the shank and tool coupling so that the housing can contain pressurized liquid coolant while the toolholder rotates. The proximal end of the toolholder shank includes a diametral bore that communicates with an axial bore present in the tool coupling. Cutting tools used in conjunction with such prior art coolant system include a through-center, coolant conducting bore extending from their shank ends all the way to their cutting ends.

In operation, when pressurized coolant is supplied to the interior of the stationary housing, liquid coolant is forced through the diametral bore of the toolholder shank and then through the axial bore in the tool coupling where it is received by the coolant conducting bore located through the center of the tool itself. The bore in the tool conducts the coolant to the interface between the cutting end of the tool and the workpiece. To conserve the coolant (which is often a mixture of water and ethylene glycol) many prior art systems collect spent coolant and recirculate it back to the source of pressurized coolant. A filtration unit is provided in the recirculation path of the coolant to remove metal chips and particles and other debris formed as a result of the cutting operation.

While such prior art through-center coolant systems have proven to be effective in providing a steady stream of coolant to the exact point of contact between the rotating cutting tool and a metal workpiece, the applicant has noted a number of areas where such systems could be improved in order to increase their overall effectiveness. For example, the dynamic fluid seals that must be incorporated between the rotating surfaces of the toolholder shank and tool coupling and the stationary walls of the housing apply a substantial amount of frictional drag which not only increases the power required to effectively turn the cutting tool, but also generates so much heat that the operation of such a toolholder must be stopped every 10 or 15 minutes in order to allow the toolholder to cool off. Even well-designed fluid seals tend to leak substantial amounts of coolant during the operation of the toolholder, not all of which is reclaimable. Also, the centrifugal forces that the diametral bore in the rotating toolholder applies to the coolant flowing into the housing works against the desired flow of coolant out of the tool which in turn requires the use of higher pump pressures than would not otherwise be necessary to obtain the desired coolant flow rate. These higher pressures necessitate tighter fluid seals, which in turn exacerbates the aforementioned frictional drag problem. Finally, the intimate contact made by the coolant flowing through the housing and the bearing surfaces located within the housing necessitates the removal of all metal particles in the reclaimed coolant larger than 5 microns across in order to protect the toolholder shank bearings from damage. Such particulate removal can only be accomplished by the use of a relatively large and expensive filtration unit that disadvantageously applies a substantial back pressure to the coolant flowing in the recirculation path of the system, which again demands higher pump pressures.

Clearly, what is needed is a through-center cooling system for a rotating toolholder that does not require the use of drag-inducing dynamic seals to maintain coolant within the housing. Ideally, such a system would be leak-free so that substantially all of the coolant used would be reclaimable. Finally, such a system would not apply unwanted centrifugal forces to the coolant as it flows to the cutting tool, and would obviate the need for a large and expensive filtration system.

SUMMARY OF THE INVENTION

Generally speaking, the invention is a rotatable toolholder having a stationary coolant feed system that overcomes or at least ameliorates all of the aforementioned shortcomings associated with the prior art. The rotatable toolholder comprises a stationary housing, a driven shaft having an output end rotatably mounted in one wall of the housing, a tool coupling rotatably mounted on an opposite side of the housing, a coolant system including a nozzle assembly stationarily mounted within the housing for directing a non-rotating stream of coolant into the coolant conducting bore of a cutting tool, and a transmission assembly within the housing for transmitting rotary power from the driven shaft to the tool coupling in order to rotate the cutting tool. The fact that the coolant nozzle assembly remains stationary relative to the driven shaft and tool coupling advantageously isolates the coolant flow from the centrifugal forces that these rotating components would normally apply to it.

The coolant system further includes a stationary conduit for conducting coolant to the nozzle assembly from a pressurized coolant source located outside of the housing while isolating the coolant flow from the interior of the housing. Because the conduit prevents the coolant from flowing into the bearings associated with the rotating components within the housing, used coolant may advantageously be recirculated back to the pressurized coolant source without the need for microparticle filtration. Whereas prior art design required filtrations units capable of removing particles as small as 5 microns across, all that the coolant system of the invention requires is a screen-type filter capable of removing only relatively large particles (i.e., particles 1 millimeter across or larger) that might possibly damage the recirculation pump or clog the fluid passageways of the system.

In the preferred embodiment, the open end of the nozzle assembly extends through an annular opening concentrically located about the axis of rotation of the tool coupling. An annular seal is provided between the nozzle assembly and the opening in the tool coupling to insure that coolant discharged through the nozzle assembly into the coolant receiving bore of the rotating tool will not back-flow into the rotating components contained within the housing of the toolholder.

The nozzle assembly may include a spindle rotatably mounted within a bore in the driven shaft that is concentrically oriented with respect to the axis of rotation of the shaft. The coolant discharge end of the nozzle assembly may similarly be rotatably mounted in the aforementioned annular opening in the tool coupling. In operation, the nozzle assembly may be used to transmit thrust forces from the driven shaft to the tool coupling thereby redirecting the thrust force away from other components. Roller bearings and thrust bearings are provided at appropriate interfaces between the nozzle assembly and the driven shaft and tool coupling in order to minimize rotary and thrust-generated friction.

While the transmission assembly may take a variety of forms, it preferably includes a drive gear concentrically mounted around a distal end of the driven shaft, a driven gear concentrically mounted around a proximal end of the tool coupling, and an idler gear assembly for transmitting rotary power from the drive gear to the driven gear in order to rotate a cutting tool attached to the tool coupling.

The stationary nozzle assembly and isolating coolant flow conduits of the system, in combination with the transmission assembly, provides a toolholder that is capable of applying coolant to the exact point of contact between a cutting tool and a workpiece without the need for drag-generating dynamic fluid seals that often leak coolant and generate unwanted frictional heat, without the generation of unwanted centrifugal forces in the coolant, and without the need for a large and expensive filtration unit in the recirculation loop of the coolant system.

BRIEF DESCRIPTION OF THE SEVERAL FIGURES

Figure 2:
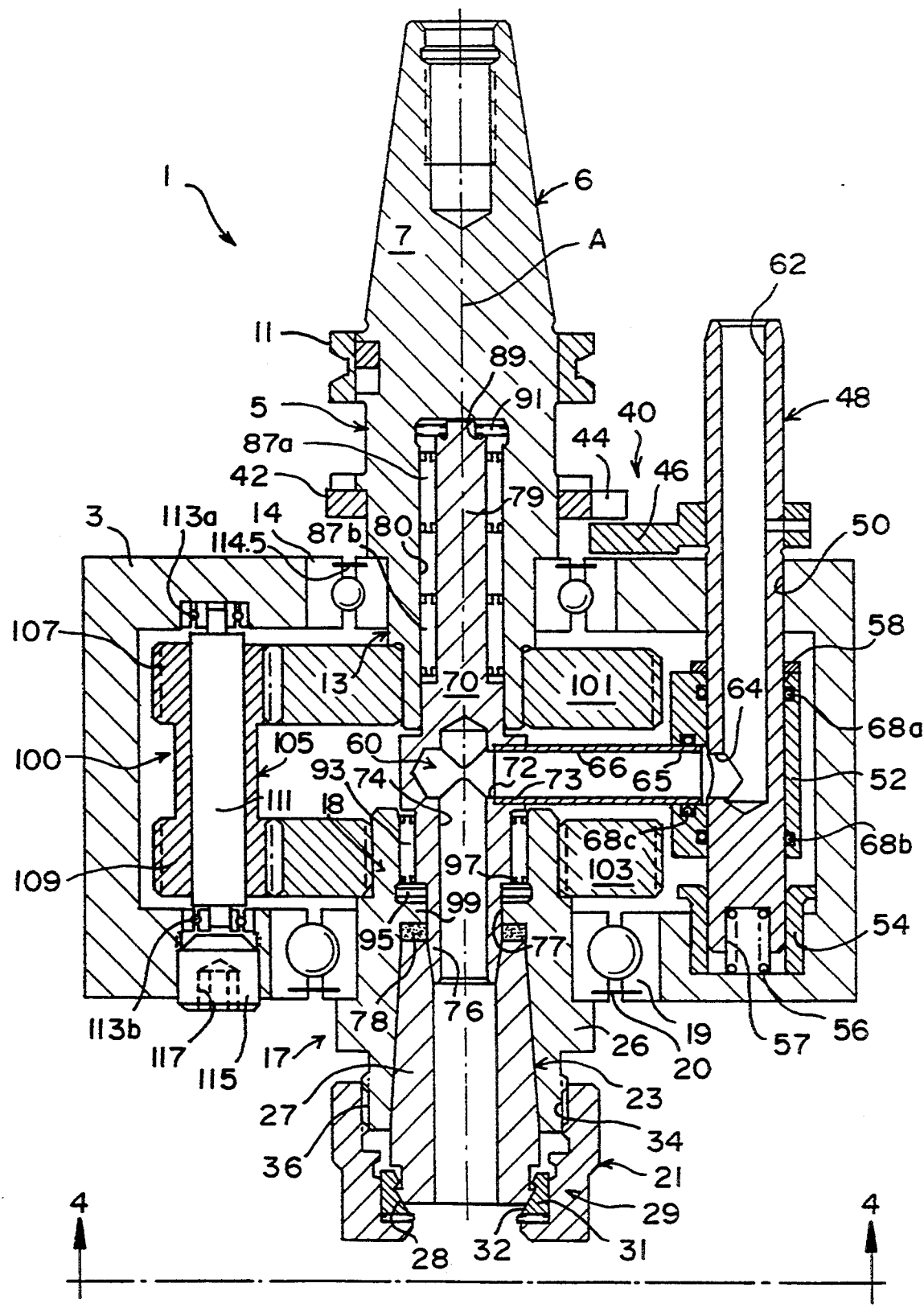
FIG. 2 is a cross-sectional side view of the toolholder illustrated in FIG. 1 shown without a cutting tool.
Figure 4:
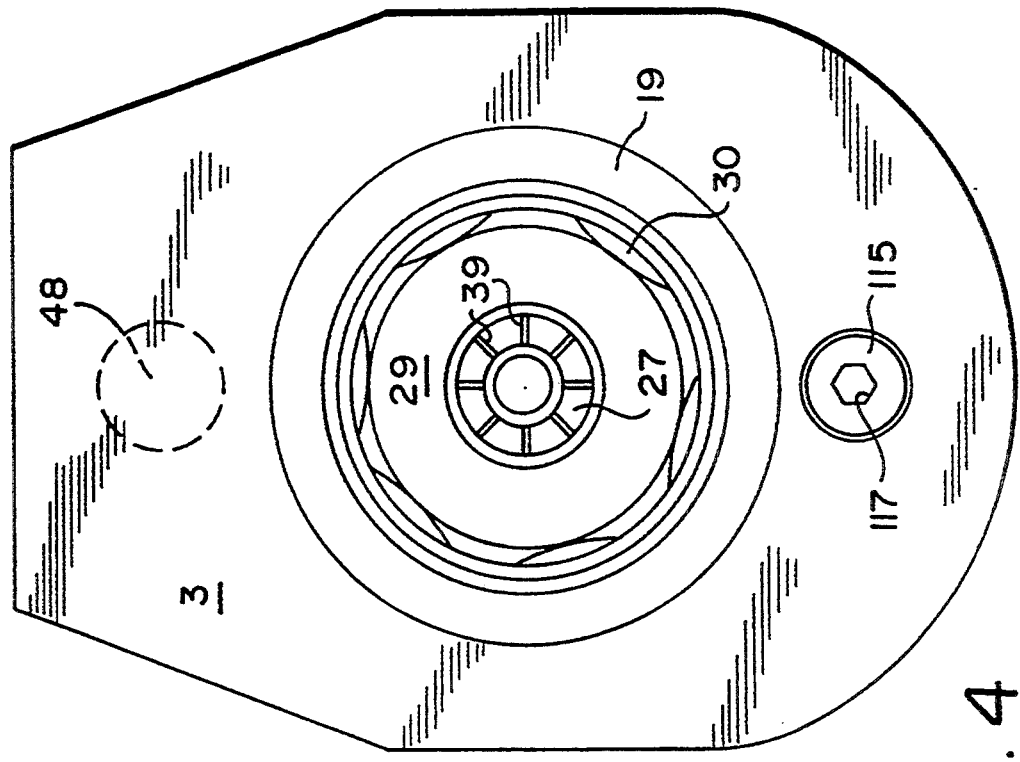
Figure 3:
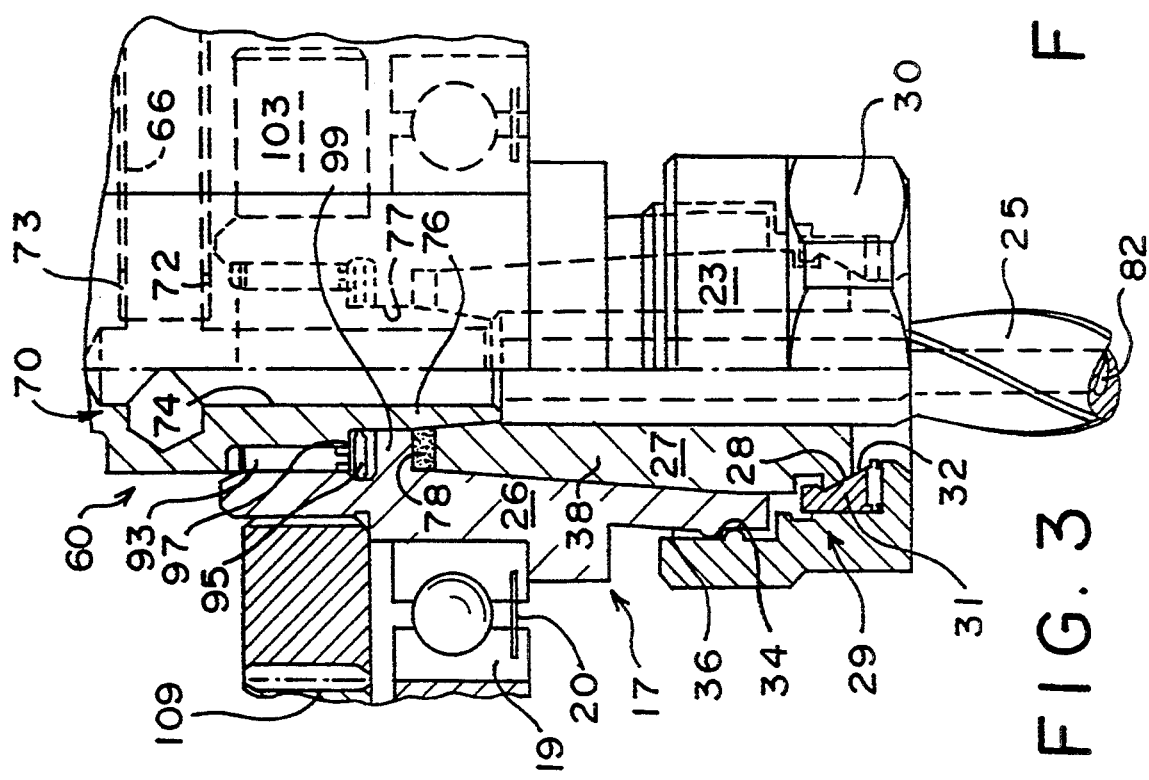

FIG. 3 is an enlarged partial cross-sectional side view of the distal end of the toolholder, illustrating the alignment between the coolant nozzle of the nozzle assembly and the coolant conducting through-center bore in the cutting tool, as well as how the tool coupling is rotatably mounted between a lower wall of the housing and the distal end of the nozzle assembly, and FIG. 4 is a bottom plan view of the toolholder illustrated in FIG. 2 along the line 4—4.

DETAILED DESCRIPTION OF THE PREFERRED EMBODIMENT

Figure 1:
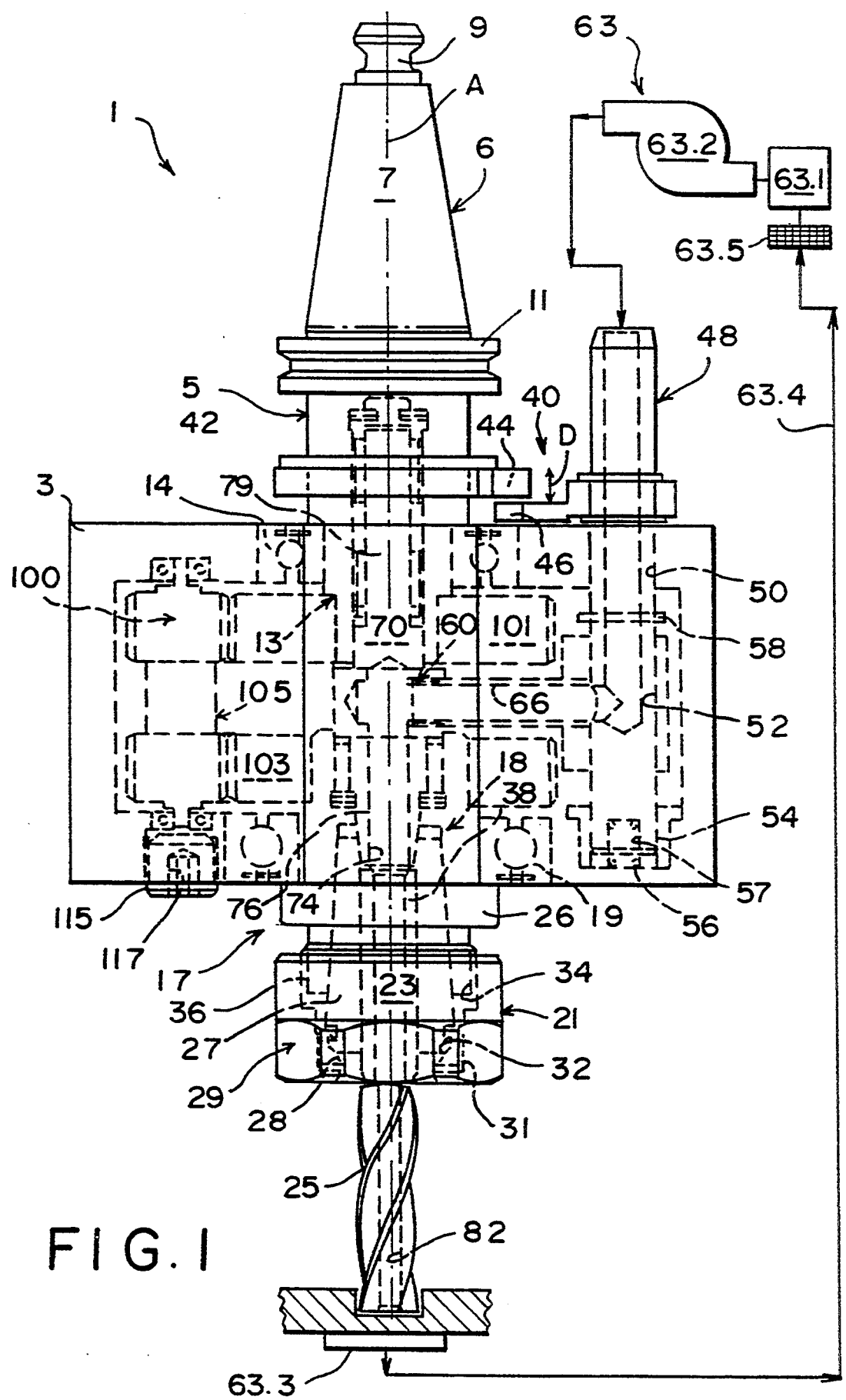
FIG. 1 is a side view of a toolholder incorporating the through-center coolant feed system of the invention, with the recirculation portion of the coolant system shown schematically.

With reference now to FIGS. 1 and 2, wherein like numbers designate like components throughout all the several figures, the toolholder 1 of the invention generally comprises a stationary housing 3, and a driven shaft 5 and tool coupling 17 rotatably mounted in upper and lower walls of the housing 3. The tool coupling 17 can detachably couple to the shank end of a cutting tool 25 as shown in FIG. 1, and the driven shaft 5, tool coupling 17, and cutting tool 25 may all be colinearly aligned so as to rotate about the same axis of rotation A.

The proximal end 6 of the driven shaft 5 includes a frustro-conical toolholder shank 7 that terminates in a retention knob 9 at its top end, and may terminate in an annular flange 11 at its bottom end. Shank 7 is receivable into a complementarily-shaped frustro-conical recess of the drive shaft (not shown) of a drive mechanism whose ultimate function is to turn the cutting tool 25. The retention knob 9 forms part of a coupling mechanism that retains the shank 7 within the drive mechanism, and flange 11 is used to impart torque from the drive mechanism to the shank 7. The driven shaft 5 further includes a distal end 13 that is rotatably mounted in an upper wall of the housing 3 by means of rotary bearing 14. Bearing 14 is provided with an annular dust seal 14.5 for keeping dust and debris out of the bearing 14. It should be noted that dust seal 14.5 applies very little friction to the bearing 14 since it does not operate to contain pressurized coolant, which was circulated within the housing in prior art through-center coolant feed systems.

With particular reference now to FIGS. 2 and 3, the proximal end 18 of the tool coupling 17 is rotatably mounted in the lower wall of the stationary housing 3 by means of a rotary bearing 19. Like the previously discussed bearing 14, bearing 19 includes a dust seal 20. The distal end of the tool coupling 17 includes a collet chuck 23 for detachably holding the shank end of a tool 25. The collet chuck 23 has a generally tubular chuck body 26 that receives a tubular collet 27. The collet 27 terminates in a beveled edge 28 for flexing the distal end of the collet inwardly in a manner that will be described in more detail hereinafter. A lock nut 29 is concentrically disposed around the distal ends of the collet 27 and chuck body 26. Wrench flats 30 are provided around the periphery of the lock nut 29 to facilitate the turning thereof, The distal end of the lock nut 29 retains a nose ring 31 having a beveled edge 32 complementary in shape to the beveled edge 28 of the collet 27. The inner diameter of the proximal end of the lock nut 29 is circumscribed by screw threads 34 engageable with screw threads 36 circumscribing the distal end of the chuck body 26. When the lock nut 29 is screwed upwardly into the position shown in FIGS. 2 and 3, the beveled edge 32 of the nose ring 31 wedgingly squeezes the distal end of the collet 27 radially inwardly such that the inner diameter of the collet 27 tightly grips the shank 38 of the cutting tool 25. In order to render the collet 27 radially compressible by the beveled edge 32 of the nose ring 31, a plurality of longitudinally oriented slots 39 (visible in FIG. 4) are provided around the circumference of the collet 27.

With reference again to FIGS. 1 and 2, the toolholder 1 includes a locking and orienting mechanism 40. Mechanism 40 prevents the driven shaft 5 from being rotated with respect to the stationary housing 3 (and also prevents coolant from flowing into the housing 3) until it is deactuated in a manner which will be described in detail hereinafter. The locking and orienting mechanism 40 renders the toolholder suitable for use in automated tooling systems by providing a tool orientation reference point, as well as a positive means for stopping the rotation of the shaft 5 after a given number of turns has been accomplished. To this end, mechanism 40 includes a lock flange 42 that circumscribes the central portion of the driven shaft 5. The lock flange 42 includes a rectangular recess 44. Recess 44 is capable of receiving the end of a complementarily shaped lock bar 46 that is mounted on a reciprocally movable coolant inlet conduit 48. In FIGS. 1 and 2, the coolant inlet conduit 48 has been pushed down a distance D such that the lock bar 46 is disengaged from the recess 44. In this position, the driven shaft 5 can be rotated independent of the stationary housing 3. However, the lock bar 46 engages the rectangular recess 44 at a known rotational orientation thereby positioning the flange 7 in a known position so that the toolholder 1 may be removed from the drive shaft and another toolholder inserted in its place.

The manner in which the conduit 48 reciprocally moves in the housing 3 will next be described. As is best seen in FIG. 2, the coolant inlet conduit 48 is generally tubular in shape, and is slidably movable through a circular bore 50 present in the upper wall of the stationary housing 3. The bottom of the conduit 48 extends through, and is slidably movable in, both a valve barrel 52 and a tubular sleeve 54. A compression spring 56 is captively mounted within a cylindrical recess 57 present on the bottom end of the coolant inlet conduit 48, and biases the conduit 48 upwardly so as to engage the lock bar 46 into recess 44. An annular stop 58 circumscribes the outer diameter of the inlet conduit 48 in the area between the bore 50 in housing 3, and the top of the valve barrel 52. When the coolant inlet conduit 48 is pressed downwardly a distance D with a force sufficient to over come the upward biasing force of the compression spring 56, the conduit 48 slides into the position illustrated in FIGS. 1 and 2, whereby the end of the lock bar 46 becomes disengaged from the rectangular recess 44 of the lock flange. Shaft 5 may now be rotated with respect to the stationary housing 3. However, when the downward force against the coolant inlet conduit 48 is removed, the compression spring 56 raises the conduit 48 upwardly until the annular stop 58 is pressed against the under side of the top wall of the housing 3, whereby the end of the lock bar 56 is again disposed within the rectangular recess 44 of flange 42, thereby locking the shaft 5 against rotation with respect to the stationary housing 3.

With particular reference again to FIGS. 1 and 2, the coolant feed system 60 of the invention is comprised of the previously mentioned coolant inlet conduit 48 and valve barrel 52, in combination with a pressurized coolant source 63, a laterally disposed, connecting conduit 66, and a nozzle assembly 70. The pressurized coolant source 63 schematically illustrated in FIG. 1 is coupled to an axially disposed bore 62 in inlet conduit 48. Coolant source 63 includes a reservoir 63.1 of liquid coolant, which may be a mixture of water and ethylene glycol. The outlet end of a liquid pump 63.2 is connected to the coolant inlet conduit 48, while the inlet end of this pump is connected to the coolant reservoir 63.1 as indicated. As will be described in more detail hereinafter, pressurized coolant flows through inlet conduit 48, connecting conduit 66, and from thence through nozzle assembly 7 where it is ultimately discharged into a coolant conducting bore 82 that extends down the center of the cutting tool 25. As the cutting tool 25 cuts through a workpiece as shown in FIG. 1, spent coolant is collected and reclaimed in a collection trough 63.3. Negative pressure applied by the flow pump 63.2 draws the reclaimed coolant up through recirculation conduit 63.4, and then through a filter screen 63.5. Filter screen 63.5 serves to remove particulate debris from the coolant on the order of 1 millimeter across in order to prevent debris and metal particles present in the reclaimed coolant from either damaging the internal components of the pump 62.2 or clogging any of the liquid passageways in conduits 48 and 66 and nozzle assembly 70. As such, screen filter 63.5 is a relatively coarse filter which applies relatively little resistance to the recirculating flow of reclaimed coolant that is ultimately routed into and stored in reservoir 63.1.

With reference in particular to the flow path of the coolant between inlet conduit 48 and nozzle assembly 70, the axial bore 62 in the inlet conduit 48 terminates adjacent to a lateral bore 64 in the wall of the conduit. When the coolant inlet conduit 48 is depressed into the position illustrated in FIG. 2, the lateral bore 64 of this conduit is placed into registry with a lateral bore 65 present in a side wall of the barrel 52. The previously mentioned lateral conduit 66 connects the lateral bore 64 of the valve barrel 52 with a lateral bore 72 present in the nozzle assembly 70. Sealing rings 68a,b,c disposed on the inner ends of the valve barrel 52 and around one end of the laterally connecting conduit 66 prevent pressurized coolant from leaking outside of the valve barrel 52. Sealing rings 68a,b,c are static seals during the cutting operation and thereby can radially restrict coolant leakage. A screw joint 73 between the distal end of the laterally disposed conduit 66 and the valve assembly 70 prevents leakage of coolant between these two components.

The nozzle assembly 70 of the coolant feed system 60 includes a stationary nozzle 76 at its distal end for discharging a stream of coolant along the axis of rotation A of the toolholder 1 and tool 25. The bottom end of the nozzle 76 extends through an annular opening 77 in the chuck body 26. An annular seal 78 (which may be formed from cotton felt) circumscribes the distal end of the nozzle 76, and functions to prevent any back flow of coolant from entering the interior of the housing 3. The proximal end of the nozzle assembly 7 includes a stationary spindle 79 that is rotatably mounted in a bore 80 present in the proximal end of the driven shaft 5. Two sets of roller bearings 87a,b are disposed between the stationary spindle 79 and the bore 80 to minimize friction when the driven shaft 5 is rotated relative to the nozzle assembly 70. Additionally, the upper end of the stationary spindle 79 includes an annular recess 89 for receiving a set of thrust bearings 91 for reducing friction generated by thrust forces in this area. At the distal end of the nozzle assembly, a single set of roller bearings 93 are disposed between the outer diameter of the stationary nozzle 76 of the assembly 70, and the inner diameter of the tubular chuck body 26. A set of thrust bearings 95 is disposed between an annular shoulder 97 circumscribing the nozzle 76, and an annular flange 99 extending around the inner diameter of the chuck body 26. The spindle 79 and proximal end of the nozzle assembly 70 not only strengthen the rotatable connection between the driven shaft 5 and tool coupling 17 to the stationary housing 3, but also transmit reactive thrust forces generated by a cutting tool 25 is depressed into a workpiece. Such thrust forces are transmitted from the shank 38 of the cutting tool through the tool coupling 17 and upwardly to the driven shank 5, and the thrust bearings 91, 95 advantageously isolate the rotary bearings 14 and 19 from such forces.

With reference in particular to FIG. 2, the toolholder 1 of the invention has a transmission assembly 100 for transmitting rotary power from the driven shaft 5 to the tool coupling 17. To this end, the transmission assembly 100 includes a spur gear 101 that is concentrically mounted around and affixed to the distal end of the driven shaft 5. Transmission assembly 100 further includes a spur gear 103 concentrically mounted round the proximal end of the chuck body 26 of the tool coupling 17. Spur gears 101 and 103 are preferably of the same outer diameter so that the tool coupling 17 rotates on a one-to-one basis with the driven shaft 5. An idler gear assembly 105 transmits rotary power from the gear teeth of spur gear 101 to the gear teeth of spur gear 103, includes a pair of idler gears 107 and 109 of the same outer diameter having gear teeth which mesh with the gear teeth of spur gears 101 and 103 as shown. Each of the idler gears 107 and 109 are integrally connected by means of a tubular shaft, and are fixedly mounted onto a gear shaft 111 which is rotatably mounted to the upper and lower walls of the stationary housing 3 by way of roller bearings 113a,b. A set screw 115 provided with a hex socket 117 is threadedly engaged in a through bore located in the bottom wall of the housing 3 in order to provide axis to the idler gear assembly 105. While the interior of the housing 3 can be filled with transmission fluid in order to lubricate the various gear components of the transmission assembly 100, the use of heavy grease is preferred in order to minimize the possibility of lubricant leakage from the interior of the housing 3.

In operation, the shank 3 of the driven shaft 5 is mounted onto the output shaft (not shown) of a drive mechanism. Next, the shank 38 of a cutting tool 25 having a through-center coolant conducting bore 82 is detachably mounted in the tool coupling 17 via collet chuck 23. Next, the coolant inlet conduit 48 is then depressed downwardly in the position illustrated in FIG. 2 in order to overcome the bias of the compression spring 56, which in turn releases the lock bar 46 from the rectangular recess 44 present in the lock flange 42. Driven shaft 5 may now rotate freely, and the drive mechanism is then actuated. The rotation of the driven shaft 5 causes the tool coupling 17 and tool 25 to rotate as a result of power transmission by the transmission assembly 11. However, the housing 3, coolant inlet conduit 48 and nozzle assembly 70 all remain stationary. At the same time the cutting tool 25 rotated by the tool coupling 17 is used to cut a workpiece, pressurized coolant is introduced into the axial bore 62 of the coolant inlet conduit 48 from the pressurized coolant source 63. Coolant proceeds from conduit 48 through the valve barrel 52 and outwardly through the laterally oriented connecting conduit 66 into the nozzle assembly 70, where it is ultimately discharged through the distal end of the stationary nozzle 76. The stream of coolant then enters the coolant conducting bore 82 present in the cutting tool 25, where it is ultimately discharged out through the distal cutting end of the tool 25 at the point of rupture between the tool 25 and the workpiece. All during the cutting operation, the interior of the housing 3 is insulated from the flow of coolant via conduits 48 and 66, sealing rings 68a,b,c, and screw joint 73. Additionally, the annular seal 78 prevents any coolant that leaks out from the gap between the end of the nozzle 76 and the shank 38 of the tool 25 from back flowing upwardly into the interior of the housing 3. Further during the cutting operation, spent coolant is reclaimed and recirculated through collection trough 63.3, recirculation conduit 63.4, screen filter 63.5, and reservoir 63.1.

While the invention has been described with respect to a preferred embodiment of the inventive toolholder, various modifications, additions, and variations will become evident to persons of ordinary skill in the art. For example, the relative sizes of the drive and driven gears 101 and 103 can be varied to produce either a higher tool speed or greater torque. Additionally, the relative sizes of the gears may be altered to offset the axis of the tool from the axis of the driven shaft. Furthermore, the axis of the tool may be non-parallel to the axis of the driven shaft by modifying the gears using, for example, an interlocking pair of bevel gears to orient the axes at 45° to one another. All such modifications, variations, and additions are encompassed within the scope of this invention.

What is claimed is:

1. A rotatable toolholder having a stationary coolant feed system for providing a non-rotating coolant stream to a coolant conducting bore of a rotating tool, comprising:
   a stationary housing;
   a driven shaft having an output end rotatably mounted in said housing;
   a coupling means rotatably mounted in said housing for holding and rotating an end of a tool having an opening along its axis of rotation for receiving coolant;
   a coolant system including a nozzle assembly stationarily mounted within said housing and having a nozzle means for directing a non-rotating stream of coolant into said coolant conducting bore of said tool, and
   means for transmitting rotary power from said driven shaft to said rotatably mounted coupling means to rotate said tool end.

2. The rotatable toolholder defined in claim 1, wherein said coolant system further includes stationary conduit means for conducting a coolant flow from a source outside of said housing to said nozzle assembly while isolating said coolant flow from the interior of the housing.

3. The rotatable toolholder defined in claim 2, wherein said coupling means includes an opening for placing a distal end of said nozzle means into communication with said coolant conducting bore of said tool.

4. The rotatable toolholder defined in claim 3, wherein said coupling means further includes a sealing means for providing a fluid tight seal between said nozzle means and said opening to fluidly isolate the interior of the housing from the interior of the coupling means.

5. The rotatable toolholder defined in claim 1, wherein said nozzle assembly further includes a means for transmitting thrust forces from said coupling means to said output end of said driven shaft.

6. The rotatable toolholder defined in claim 5, wherein said thrust transmitting means includes a stationary spindle member rotatably mounted to said coupling means at a first end and to said output end of said driven shaft at a second end.

7. The rotatable toolholder defined in claim 6, wherein said spindle member is mounted in said coupling means and said output end with thrust bearings, and is oriented colinearly along the axis of rotation of said output end and said coupling.

8. The rotatable toolholder defined in claim 6, wherein said nozzle means is formed from a nozzle opening in said first end of said spindle member.

9. The rotatable toolholder defined in claim 1, wherein said transmission means includes a drive gear attached to said output end of said driven shaft, and a driven gear attached to said coupling means.

10. The rotatable toolholder defined in claim 9, wherein said transmission means further includes an idler gear assembly for transmitting rotary power from said drive gear to said driven gear.

11. A rotatable toolholder having a stationary coolant feed system for providing a through-center non-rotating coolant stream to a coolant conducting bore of a rotating tool, comprising:
 a stationary housing;
 a driven shaft having an output end rotatably mounted in a first side of said housing;
 a coupling means rotatably mounted in a second side of said housing that is opposite from said first side for holding and rotating an end of a tool having a bore along its axis of rotation for conducting coolant;
 a coolant system including
  i) a nozzle assembly stationarily mounted within said housing and having a nozzle means for directing a non-rotating stream of coolant into said coolant conducting bore of said tool in a path that is collinear with the axis of rotation of said tool; and
  ii) stationary conduit means for conducting a coolant flow from said coolant conducting bore to said nozzle assembly while isolating said coolant flow from the interior of the housing, and
 means for transmitting rotary power from said driven shaft to said coupling means through said housing to rotate said tool end.

12. The rotatable toolholder defined in claim 11, wherein said coupling means includes both an opening for placing a distal end of said nozzle means into communication with said coolant conducting bore of said tool, and a sealing means for providing a fluid tight seal between said nozzle means and said opening to fluidly isolate the interior of the housing from the interior of the coupling means.

13. The rotatable toolholder defined in claim 11, further including a source of pressurized coolant having a filtration means for filtering only particles of debris present in recirculated coolant that are larger than about one millimeter across.

14. The rotatable toolholder defined in claim 11, wherein said nozzle assembly is rotatably mounted in said coupling means at one end and in said driven shaft at an opposite end and functions to transmit reactive thrust forces from said coupling means to said driven shaft.

15. The rotatable toolholder defined in claim 14, wherein said one end of said nozzle assembly includes a spindle rotatably mounted in a bore in said driven shaft.

16. The rotatable toolholder defined in claim 14, further comprising thrust bearings located between said ends of said nozzle assembly and said coupling means and driven shaft, respectively.

17. The rotatable toolholder defined in claim 11, wherein said transmission means includes a drive gear attached to said output end of said driven shaft, and a driven gear attached to said coupling means.

18. The rotatable toolholder defined in claim 17, wherein said transmission means further includes an idler gear assembly for transmitting rotary power from said drive gear to said driven gear.

19. The rotatable toolholder defined in claim 18, wherein said idler gear assembly rotates said driven gear one rotation for every rotation of said drive gear.

20. A rotatable toolholder having a stationary coolant feed system for providing a through-center, non-rotating coolant stream to a coolant receiving opening of a rotating cutting tool having a coolant conducting bore for applying coolant to a workpiece at a point of rupture, comprising:
 a stationary housing;
 a driven shaft having an output end rotatably mounted in said housing;
 a coupling means rotatably mounted in said housing for holding and rotating the end of said cutting tool having said coolant conducting bore;
 a coolant system including
  i) a nozzle assembly stationarily mounted within said housing, said nozzle assembly having first and second ends rotatably mounted to said driven shaft and coupling means, respectively, for conducting reactive thrust forces therebetween, and including a nozzle means for directing a non-rotating stream of coolant into said coolant conducting bore of said tool; and
  ii) stationary conduit means for conducting a coolant flow from said coolant conducting bore to said nozzle assembly while isolating said coolant flow from the interior of the housing, and
 means for transmitting rotary power from said driven shaft to said coupling means through said housing to rotate said tool end.

* * * * *